United States Patent
Heit et al.

(10) Patent No.: US 8,535,579 B2
(45) Date of Patent: Sep. 17, 2013

(54) METHOD FOR THE PRODUCTION OF SPHERICAL COMBUSTIBLE OR FERTILE MATERIAL PARTICLES

(75) Inventors: Werner Heit, Grossenhausen (DE); Martin Kadner, Maintal (DE); Georg Braehler, Freigericht (DE); Karl Froschauer, Freigericht (DE); Guo Wenli, Beijing (CN); Liang Tonxiang, Beijing (CN); Tang Chunhe, Beijing (CN); Yaping Tang, Beijing (CN)

(73) Assignee: Nukem Technologies GmbH, Alzenau (DE)

( * ) Notice: Subject to any disclaimer, the term of this patent is extended or adjusted under 35 U.S.C. 154(b) by 250 days.

(21) Appl. No.: 12/600,509

(22) PCT Filed: May 20, 2008

(86) PCT No.: PCT/EP2008/056169
§ 371 (c)(1),
(2), (4) Date: Nov. 20, 2009

(87) PCT Pub. No.: WO2008/142072
PCT Pub. Date: Nov. 27, 2008

(65) Prior Publication Data
US 2010/0077657 A1    Apr. 1, 2010

(30) Foreign Application Priority Data

May 24, 2007   (DE) .......................... 10 2007 024 536
Aug. 8, 2007   (DE) .......................... 10 2007 037 473

(51) Int. Cl.
*G21C 21/00*    (2006.01)
(52) U.S. Cl.
USPC ....................................................... 264/0.5
(58) Field of Classification Search
USPC ....................................................... 264/0.5
See application file for complete search history.

(56) References Cited

FOREIGN PATENT DOCUMENTS

| DE | 1 817 092 | 8/1960 |
| DE | 1 592 477 | 11/1970 |
| DE | 2 037 232 | 3/1972 |
| DE | 24 59 445 | 7/1976 |
| DE | 3208047 | 9/1982 |

OTHER PUBLICATIONS

Fu et al "Preparation of UO2 Kernel for HTR-10 Fuel Element", J. Nucl. Sci. Techn., vol. 41, No. 9, 2004, pp. 943-948.
Zimmer et al "Aqueous Chemical Processes for the Preparation of High Temperature Reactor Fuel Kernels", Radiochimica Acta, Munich, vol. 25, Jan. 1, 1978, pp. 161-169.
Naefe et al "Preparation of Uranium Kernels by an External Gelatin Process", Nuclear Technology, Amer. Nuclear Soc., vol. 42, Aug. 1978, pp. 163-171.
Zimmer et al SGMP—An Advanced Method for Fabrication of UO2 and MOX Fuel Pellets, J. Nucl. Mat. vol. 152, 1988, pp. 169-177.
Xiaoming Fu, et al., "Preparation of UO2 Kernel for HTR-10 Fuel Element", Journal of Nuclear Science and Technology, vol. 41, No. 9, pp. 943-948, Sep. 2004.

*Primary Examiner* — Larry Thrower
(74) *Attorney, Agent, or Firm* — Ladas & Parry, LLP

(57) ABSTRACT

A method for the production of spherical combustible or fertile material particles from an oxide of the group of the heavy metals uranium, plutonium, or mixtures thereof. For this purpose, the process steps of producing a base solution of the nitrates of the heavy metal(s), adding at least one first reagent in order to adjust the viscosity of the solution, dropping the solution to form microspheres, at least superficially solidifying the microspheres in an atmosphere containing ammonia, collecting the microspheres in a solution containing ammonia, and subsequent washing, drying and thermal treatment are carried out, where at least one of urea, ammonium carbonate, ammonium hydrogen carbonate, ammonium cyanate, and biuret are added to the base solution before adding the first reagent. The solution thus prepared is heated to a temperature T where $80°\text{C.} \leq T < T_s$ and where $T_s$=boiling temperature of the solution, and is maintained at the temperature over a time period t where $2\ h \leq t \leq 8\ h$.

10 Claims, No Drawings

METHOD FOR THE PRODUCTION OF SPHERICAL COMBUSTIBLE OR FERTILE MATERIAL PARTICLES

The invention relates to a method for the production of spherical fuel or breeder material particles from an oxide of the group of the heavy metals uranium, thorium, plutonium or mixtures thereof comprising the process steps of producing a starting solution of the nitrates of at least one of the heavy metals, adding a first reagent from the group of urea and/or ammonium carbonate and/or ammonium hydrogen carbonate and/or ammonium cyanate and/or biuret, adding at least one second reagent in the form of PVA and/or THFA in order to adjust the viscosity of the solution, transforming the solution into droplets to form microspheres, solidifying the microspheres, at least in the surface region, in an atmosphere containing ammonia, collecting the microspheres in a solution containing ammonia and subsequent rinsing, drying and thermal treatment.

In high temperature reactors which are increasingly becoming of interest again because of their safety properties and the likelihood of using the high operating temperatures for generating process heat, normally graphitic fuel elements of various geometrical configurations are used. These have in common that the actual fuel or breeder material, the uranium, thorium or plutonium, is present therein in the form of so-called coated particles. These are spherical particles of the respective heavy metal oxides with diameters of between 0.1 and 1 mm, coated by layers of carbon and, for example, silicon carbide in order to render them suitable for use in the reactor. The pure oxide microspheres are referred to in nuclear technology as cores or, in the English speaking world, as kernels.

Normally, for generating the kernels one proceeds from the appropriate nitric acid solutions: the low-viscosity nitrate solutions are transformed into high-viscosity solutions which are transformed as perfectly as possible into spherical droplets in order to subsequently convert them into solid gel microspheres by chemical reaction, hence also referred to as solution/gel-process. The reagent of choice for the reaction to form a solid body is ammonia: uranium reacts to form ADU (ammonium diuranate), thorium or plutonium to form hydroxide. To date two methods are being used to produce these kernels.

The methods of "internal gelling" proceed from relatively highly-concentrated solutions, feeding solutions of the heavy metals in droplet form into heated organic oils, in which case the release of ammonia from the additives Urotropine, urea or the like, causes the solidification. A problem here is the use of the oils as a precipitation bath: that is to say, in further steps the fresh kernels need to be rinsed with water in order to remove reaction products. This inevitably creates water/oil mixtures which must be regenerated again in a complex manner. This causes considerable technical problems, in particular in view of the fact that radioactive liquids are involved.

Methods for "external gelling" transform relatively low-concentrated solutions (approx. 100 g U/l) into droplets in an ammonia atmosphere, collect the microspheres generated in an ammonia solution, leaving them there to age (reacting to form ADU or the hydroxides), rinsing them first with ammonia-containing water, thereafter, however, with a water-miscible organic solvent, e.g. with isopropanol or another alcohol. The first rinsing, the one using water, removes the by-products of the reaction, such as ammonium nitrate as well as the added THFA (tetrahydrofurfuryl alcohol). The second rinsing, the one using isopropanol, removes the water from the kernels. Rinsing must even be performed with absolute isopropanol, which is particularly complex as the work-up of isopropanol for recycling needs to be performed beyond the azeotrope conditions. Only anhydrous kernels can subsequently be processed further without being damaged. The dry kernels are calcined in order to remove the organic components contained therein, reduced and finally sintered into the $UO_2$ kernel.

The disadvantage of both methods is the necessity of having to use organic liquids for the (post-) treatment of the newly formed fuel/breeder material droplets:

The areas of production in which they are used must meet strict requirements regarding explosion protection. The use of certain apparatus such as continuous driers which are advantageous from a process-technical aspect is even impossible.

Their emission from environmental points of view is restricted, they need to be removed from the exhaust air flows.

Their disposal or recycling is complex, particularly since recycling requires conversion to the water-free state.

All in all, using organic substances contributes significantly to the still considerable costs of producing fuels for high-temperature reactors.

DE-B-20 37 232, DE-B-15 92 477, DE-B-18 17 092 are being cited as examples of the state of the art describing such methods. DE-B-24 59 445 describes that an aqueous suspension of uranyl nitrate, polyvinyl alcohol (PVA), urea and carbon black is transformed into droplets. DE-A-19 60 289 uses an aqueous solution of uranyl nitrate and urea to which hexamethylenetetramine is added within a temperature range of between 0° C. and 10° C. in order to obtain a stable solution. The stable solution is fed as droplets by means of a nozzle cooled to 5° C. into paraffin oil.

From the reference "Journal of NUCLEAR SCIENCE and TECHNOLOGY", Vol. 41, No. 9, p. 943-948 (September 2004), "*Preparation of $UO_2$ Kernel for HTR-10 Fuel Elements*", a method for producing combustible material particles is known according to which urea is added to a uranium solution prior to the addition of PVA and THFA.

It is the object of the present invention to develop a method which retains the known favourable properties of fuel or breeder material kernels which are produced according to the solution/gel method, but which avoids the use of problematic organic substances. In addition, a concentrated solution of water-soluble, complex cations of the heavy metals is to be provided in order to allow simple further processing avoiding the drawbacks associated with the state of the art. In this context and in an unproblematic manner a stable solution is to be produced, which is to be transformed into droplets.

The object is attained according to the invention substantially in that the first reagent is added to the starting solution at room temperature and the solution thus prepared is heated to a temperature T where $80°≦T<T_s$ where $T_s$=boiling temperature of the solution and is maintained at said temperature over a period of time t where $2\ h≦t≦8\ h$, the solution is subsequently cooled to a temperature $T_A$ where $T_A≧$room temperature and finally the second reagent is added. In particular, the second reagent is added to the solution at room temperature, in which case the said second reagent should be dissolved in solid form in order to prevent dilution of the solution.

Surprisingly, it was found that if the starting solution containing the dissolved first reagent is heated at an elevated temperature, preferably in the range of between 80° C. and 100° C., in particular in the range of 90° C. and is maintained at this temperature for several hours, preferably 3 to 6 hours, the solution remains stable while at the same time the decomposition of the first reagent and the removal of excess water take place and at the same time a concentrated solution of water-soluble complex cations of the heavy metals is generated, which can then, after the second reagent has been added according to the gel-precipitation process, be solidified into microspheres in an ammonia-containing atmosphere, in which case the use of an alcohol such as isopropanol is not necessary for the subsequent post-treatment of the rinsed microspheres.

The starting solution itself should be a 1 to 2.5 molar nitrate solution.

In order to remove the water still present in the microspheres after rinsing, further processing is performed in a reduced pressure atmosphere. In this context it is the intention that further processing for the removal of water is performed at a pressure p where 0.07 MPa$\leq$p$\leq$0.09 MPa.

According to the invention, urea or a first reagent acting in the same way is added to the starting solution at room temperature, more in particular, in the solid state in order to prevent dilution of the solution. The solution thus prepared is then heated to a temperature below boiling point, preferably in the range of between 80° C. and 100° C., in particular about 90° C. over a time period of between 3 and 6 hours, preferably about 4 hours, in which case the decomposition of the urea or the first reagent acting in the same way and the removal of the excess water results in a concentrated solution of water-soluble complex cations of the heavy metals. By adding PVA and/or THFA serving as the second reagent, microspheres are then produced according to the gel-precipitation method, which are subjected to subsequent treatment in a manner known per se but avoiding the use of alcohol.

As a result, in accordance with the state of the art, the casting solution, that is to say the solution adjusted to a desired viscosity, is transformed into droplets in vibration nozzles to form microspheres, the latter being solidified in the surface region in an ammonia atmosphere, then collected in an aqueous ammonia solution in which they are left to age. The microspheres are subsequently rinsed, dried, calcined and finally reduced to the desired kernels and sintered. As far as that is concerned, reference is however made to process steps which are part of the state of the art. However, in contrast to these process steps post-treatment is performed without the use of alcohol.

According to the invention, the solution is prepared without the use of hexamethylenetetramine. Cooling below room temperature is thus not necessary.

According to the invention a casting solution is prepared as known per se from the known "external gelling" method, wherein the first reagent is however added at an elevated temperature for internal release of ammonia. At the same time, in comparison with known methods, the quantity of the second reagent such as PVA and/or THFA may be reduced substantially. The first reagent such as urea allows increasing the uranium concentration to values of e.g. up to 400 g/l (conventional methods with external gelling operate at concentrations of about 100 g/l). This solution can then be converted into relatively small droplets, the droplets then being gelled in an ammonia atmosphere, whereafter they are aged in an ammonia solution at an elevated temperature, rinsed with water, dried, calcined and sintered to form $UO_2$-kernels conforming to specification.

For the production of spherical fuel or breeder material particles from uranium-, thorium- or plutonium oxide or appropriate mixed oxides within a diameter range of preferably about 0.1 mm to 1 mm it is possible to mix a solution of the appropriate heavy metal nitrates with urea or a first reagent acting in the same way, the former or the latter releasing ammonia in a hot environment, thus reacting as a precipitation agent, as well as with additives for adjusting the viscosity, to transform this solution into droplets, to solidify the surface regions of the microspheres generated in an ammonia atmosphere, to further solidify the microspheres in an ammonia solution at an elevated temperature, to rinse them with water only and not with organic solvents, to dry, calcine and finally sinter them into the end product.

In particular, the invention provides that to the solution PVA and THFA is added in a quantitative ratio of about 1:10, in particular about 50 g/kgU PVA and about 500 g/kgU THFA.

The invention is elucidated in more detail below by way of examples, from which further details, advantages and characteristics of the invention are apparent. The quantities or ratios and parameters set out there are to be interpreted as being significant on their own, even independently of the other data stated.

EXAMPLE 1

For a kernel batch, 20 kg of uranium in the form of $U_3O_8$ are dissolved in nitric acid, 8.8 kg urea being added to the resulting solution of uranyl nitrate after cooling and filtering, and maintained at about 90° C. for 4 h. After cooling, 1 kg PVA as well as 9.5 kg THFA are added and the solution is homogenized.

This solution is now transformed into droplets of the required size via nozzles in vibrating plates, in the present example for a target diameter of the finished kernels of 500 μm, the droplets falling through an approximately 50 mm high ammonia gas path before they plunge into the precipitation bath of a 7-12 molar $NH_3$-solution and gel there.

The fresh kernels are transferred with the precipitation solution flow into the vessels for aging, rinsing, drying and are left to age here for several hours at about 60° C., subsequently they are rinsed repeatedly with water, likewise at about 60° C., and finally vacuum-dried at up to 80° C.

The dried kernels are first calcined into $UO_3$ in appropriate kilns in the presence of air according to a specific temperature program ranging between 100° C. and 500° C., then reduced and sintered into $UO_2$ kernels under hydrogen at 600° C. to 700° C. and subsequently at 1650° C.

According to conventional methods of quality control such as screening and sorting, $UO_2$-kernels can be made available for further processing with the properties set out in the following table with a yield exceeding 90%:
Properties of the $UO_2$ Kernels

| | |
|---|---|
| Diameter/μm | $450 \leq x \leq 550)_{95/95}$ |
| Density/(g · cm$^{-3}$) | $x \geq 10.4$ |
| Sphericity $(D_{max}/D_{min})^{(1)}$ | $(x \leq 1.2)_{95/95}$ |
| O/U ratio | $1.99 \leq x \leq 2.01$ |

EXAMPLE 2

For a $UO_2$-kernel batch having a diameter of 500 μm, 4 kg uranium in the form of $U_3O_3$-powder are dissolved in nitric acid. The solution is prepared by heating to 90° C. within 4 hours, bringing about a stoichiometric uranyl nitrate solution having the composition of $UO_2$ $(NO_3)_2$. After cooling and filtering 8 l of solution are obtained with 500 g U/l.

In this solution 0.44 kg urea/kgU, that is to say 1.76 kg urea in total are dissolved at room temperature.

This solution is subsequently heated to about 90° C. and maintained at this temperature for 4 hours. Thereafter the hot solution is cooled to room temperature and used for preparing a casting solution. The volume is 8.1 l/4 kgU, corresponding to a U-content of 494 g/l and a density of about 1.6 g/ml.

For preparing the casting solution, polyvinyl alcohol (PVA) is used, inter alia for increasing the viscosity. By dissolving the PVA in ultra pure water, a 10 wt-% PVA solution is prepared, the density thereof being 1.022 g/ml.

For a batch of casting solution bath of 4 kgU, corresponding to 4.5 kg $UO_2$-kernels having a diameter of 500 μm, the following components are mixed to form a homogenous casting solution:

8.1 l of the uranyl nitrate solution heated with urea to 90° C. for 4 h and cooled again to room temperature
1.92 k of the 10 wt-% PVA solution
2.0 l tetrahydrofurfuryl alcohol having a density of 1.05 g/ml (Kp 177° C.).

The volume of this casting solution is 12.0 l and the weight 17.3 kg. The U-content of the solution is 231 g/kg and the viscosity is in the range of 55 to 80 mPa×s.

The casting solution is divided into uniform drops in a manner known per se by means of 5-flow-meters and a 5-nozzle-vibrator-system at a frequency of 100 Hertz, the droplets after being formed into microspheres in ammonia gas being left to pre-cure and thereafter being collected in a 5 to 12 molar ammonia solution as spherical particles of ammonium diuranate.

With a U-content per 500 μm-$UO_2$-kernels of 0.622 mg, at f=100 Hertz and a U-content of the casting solution of 231 g/kg a throughput volume Q per nozzle of $$Q=0.622 \cdot f \cdot 60/231=16.15 \text{ g/min}$$

results.

For a 5-nozzle-vibrator-system a throughput of 80.75 g of casting solution/min or of 4.845 kg/h, respectively, results.

In an aging-, rinsing and drying vessel of criticality-proof geometry the kernels are aged in an ammonia solution at 60° C., rinsed subsequently three times with de-ionized water at 60° C., 20 minutes each time and then dried at low pressure of 0.07-0.09 MPa for 6 hours at 80 to 90° C.

After calcination at 300° C. in the presence of air, subsequent reduction and sintering under $H_2$/Ar-gas at up to 1600° C. the UO2-kernels with a diameter of 500±50 μm and a density of 10.8 g/cm$^3$ met the requirements.

The invention claimed is:

1. Method for the production of spherical fuel or breeder material particles from an oxide consisting of the heavy metals uranium and plutonium, the method comprising the steps of:
    producing a starting solution of nitrates of the heavy metals,
    adding a first reagent from the group of urea and/or ammonium carbonate and/or ammonium hydrogen carbonate and/or ammonium cyanate and/or biuret,
    adding at least one second reagent comprising PVA and THFA in order to adjust the viscosity of the solution, transforming the solution into droplets to form microspherules,
    solidifying the microspherules, at least in a surface region, in an atmosphere containing ammonia,
    collecting the microspherules in a solution containing ammonia and subsequent rinsing, drying and thermal treatment, characterized in that:
    the first reagent of the starting solution is added at room temperature and the solution thus prepared is heated to a temperature T where 80° C.$\leq$T<$T_s$, where $T_s$=boiling temperature of the solution and is maintained at said temperature over a period of time t, where 2 h$\leq$t$\leq$8 h, the solution is subsequently cooled to a temperature $T_A$, where $T_A$=room temperature, and finally, the second reagent is added.

2. Method according to claim 1, characterized in that the solution is cooled to room temperature prior to adding the second reagent.

3. Method according to claim 1, characterized in that the first reagent from the group of urea and/or ammonium carbonate and/or ammonium hydrogen carbonate and/or ammonium cyanate and/or biuret is dissolved in solid form in the starting solution.

4. Method according to claim 1, characterized in that the solution is maintained at a temperature T where T≈90° C. over a period of time t.

5. Method according to claim 1, characterized in that the solution is maintained at a temperature T over a period of time t where 3 h$\leq$t$\leq$6 h.

6. Method according to claim 1, characterized in that a 1 to 2.5 molar nitrate solution is used as the starting solution.

7. Method according to claim 1, characterized in that the rinsed microspherules are subjected to subsequent treatment without using alcohol.

8. Method according to claim 1, characterized in that after rinsing of the microspherules water present in the latter is removed by further treatment in a reduced pressure atmosphere.

9. Method according to claim 1, characterized in that the further treatment for removing water is performed at a pressure p where 0.07 MPa$\leq$p$\leq$0.09 MPa.

10. Method according to claim 1, characterized in that the PVA and THFA are added to the solution in a quantitative ratio of about 1:10.

* * * * *